(12) United States Patent
Tsui et al.

(10) Patent No.: US 11,850,686 B2
(45) Date of Patent: Dec. 26, 2023

(54) HEIGHT ADJUSTABLE REST

(71) Applicant: Valtra Inc., Santa Fe Springs, CA (US)

(72) Inventors: Gary Tsui, San Marino, CA (US); Daqing Zhu, Shanghai (CN)

(73) Assignee: Valtra Inc., Santa Fe Springs, CA (US)

( * ) Notice: Subject to any disclaimer, the term of this patent is extended or adjusted under 35 U.S.C. 154(b) by 991 days.

(21) Appl. No.: 16/786,626

(22) Filed: Feb. 10, 2020

(65) Prior Publication Data
US 2021/0245308 A1 Aug. 12, 2021

(51) Int. Cl.
*B23K 37/053* (2006.01)
*B23K 37/04* (2006.01)

(52) U.S. Cl.
CPC .......... *B23K 37/0536* (2013.01); *B23K 37/04* (2013.01); *B23K 37/0452* (2013.01)

(58) Field of Classification Search
CPC .......... B23Q 1/032; B23Q 1/037; B23Q 1/25; B23Q 1/46; B23Q 3/18; B23Q 3/106; B23Q 3/107; F16M 11/18; F16M 13/02; F16M 13/022; F16M 2200/025; F16M 2200/028; A47B 91/02; A47B 91/026; A47B 91/028; B23K 37/04; B23K 37/0452

USPC ........ 269/55, 289 R, 309; 254/98, 100, 103; 248/188.1, 188.2, 188.4, 354.1
See application file for complete search history.

(56) References Cited

U.S. PATENT DOCUMENTS

| | | | | | |
|---|---|---|---|---|---|
| 2,819,529 | A | * | 1/1958 | Beck | B66F 3/08 254/98 |
| 3,140,547 | A | * | 7/1964 | Blommel | B25B 5/107 33/821 |
| 9,287,636 | B2 | * | 3/2016 | Song | H01R 4/36 |
| 10,132,427 | B1 | * | 11/2018 | Park | F16L 1/09 |

\* cited by examiner

*Primary Examiner* — Lee D Wilson
*Assistant Examiner* — Alberto Saenz
(74) *Attorney, Agent, or Firm* — Jen-Feng Lee, Esq.

(57) ABSTRACT

Present invention teaches a height adjustable rest having four main parts: a base, a cylindrical knob, a cylindrical post and a snap ring. The cylindrical post has a vertical straight groove to guide the up-and-down height adjustment when the knob is turned relative to the base. The base holes and the knob holes, along with the corresponding rods, provide increased torque when larger and/or heavier workpiece is being supported. The matching inner thread portion (on the inside of the cylindrical knob) and the outer thread portion (on the outside of the base) is a desired feature to make the product less susceptible to damages or work debris compared to other products with exposed threads.

4 Claims, 4 Drawing Sheets

HEIGHT ADJUSTABLE REST

FIELD AND BACKGROUND OF THE INVENTION

Present invention disclosed and claimed a height adjustable rest that can be used on a welding table or other surfaces similar to a welding table to support work objects.

Available products on the market are either difficult to operate because of insufficient torque when dealing with large/heavy work pieces or that the turning threads on the products get damaged easily due to the exposed design.

Present invention overcomes such deficiencies by the structure that generates greater torque when setting the desired height and makes the threads into an internal feature not subject to damaging force or debris.

An earlier height adjustable rest was shown in U.S. Pat. No. 9,827,636 ('636 patent), with overlapping ownership with the present invention. The earlier model is different from the invention disclosed herein in significant ways.

The snap ring (element 24) in the earlier model is located at the top portion of the post (FIGS. 11 and 12 of the '636 patent), whereas the present invention puts the snap ring under the flange of the cylindrical post (shown in FIGS. 2 and 3 of present invention).

The cylindrical post in present invention is made to be bigger, able to support heavier or bigger workpieces, whereas the earlier model does not work well for heavier or bigger workpieces.

There is no locking screw element on the earlier model (in '636 patent) to lock the post in place once a desired height is reached. These are just a few exemplary places that show the significant differences between the earlier model and the disclosure herein.

SUMMARY OF THE INVENTION

The height adjustable rest of present invention contains four main parts: a base, a cylindrical knob, a cylindrical post and a snap ring.

The base, the cylindrical knob and the cylindrical post are all substantially in a tubular or cylindrical shape as shown in the drawings.

The flange on top of the cylindrical post provides a strong and stable surface to prop up heavy objects, with the snap ring snugly fitted around the circumference of the tube body, as shown in the drawings; the snap ring is fitted to a snap groove to prevent the cylindrical post from dropping off.

A key can be inserted through a key hole on the base to reach a vertical straight groove on the cylindrical post.

The cylindrical knob is rotatably fitted to the outside of the base. The cylindrical knob has an inner screw thread portion matching the outer screw thread portion of the base.

The cylindrical knob further has a threaded hole with matching locking screw; the cylindrical post further has a landing groove for receiving the locking screw. The locking screw serves to lock the height adjustable rest in place when a desired height is reached.

A plurality of knob holes and a plurality of base holes, along with corresponding rods, provide increased torque power for turning the knob relative to the base for adjusting to the desired height, especially when larger or heavier workpieces are being supported.

The matching screw thread portions (inner screw threads and outer screw threads) protect the threads from damage by the debris generated by welding or any work process, as compared to other comparable designs that exposed screw threads.

DESCRIPTION OF THE DRAWINGS

The accompanying drawings, which are incorporated in and constitute a part of this specification, illustrate and exemplify the preferred embodiments of the invention. Together with the description, serve to explain the principles of the invention.

A brief description of the drawings is as follows.

DETAILED DESCRIPTION OF THE PREFERRED EMBODIMENT

Figure 1:
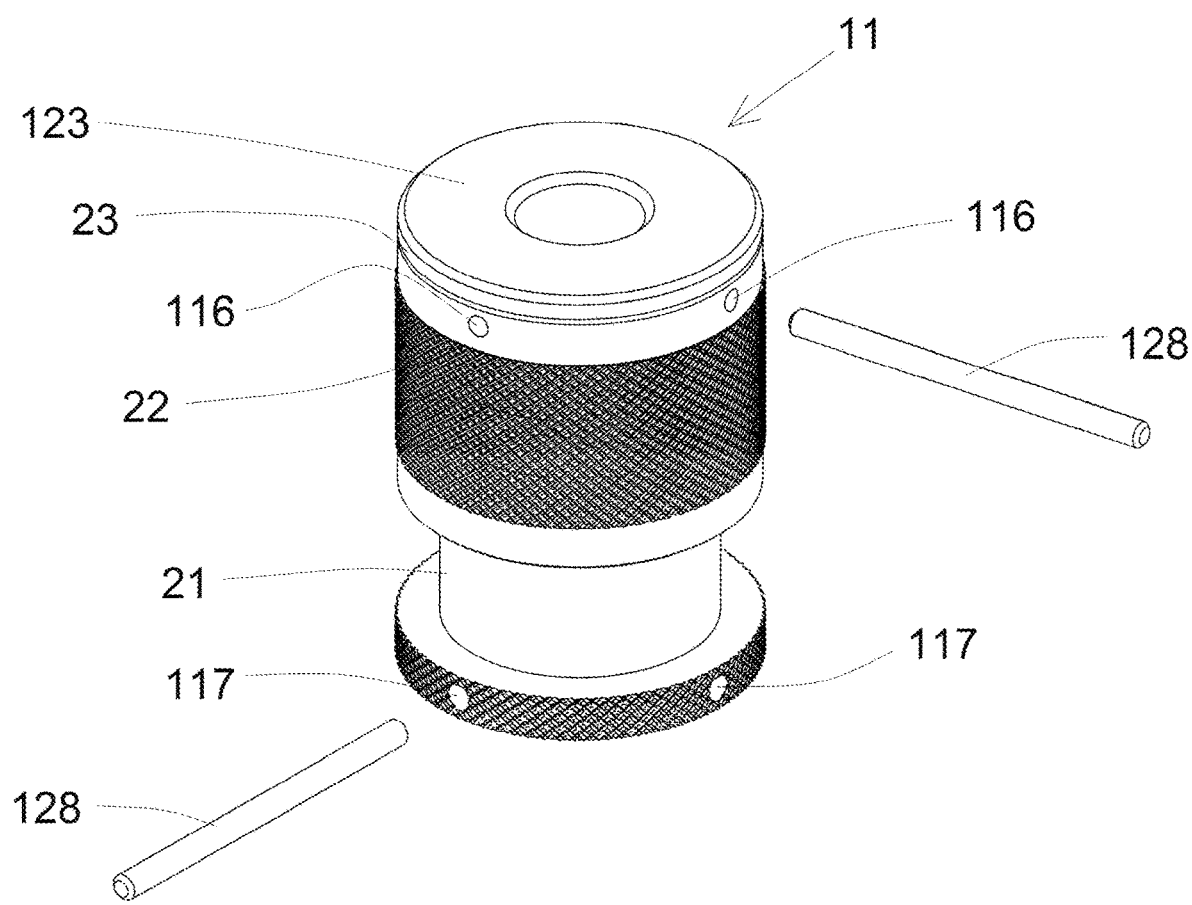
FIG. 1 is the assembled view of the present height adjustable rest with rods shown ready to insert to the knob holes and the base holes.

The height adjustable rest 11 of present invention is comprised of four main parts: a base 21, a cylindrical knob 22, a cylindrical post 23 and a snap ring 24. The four main parts can be seen in FIG. 2.

Figure 2:
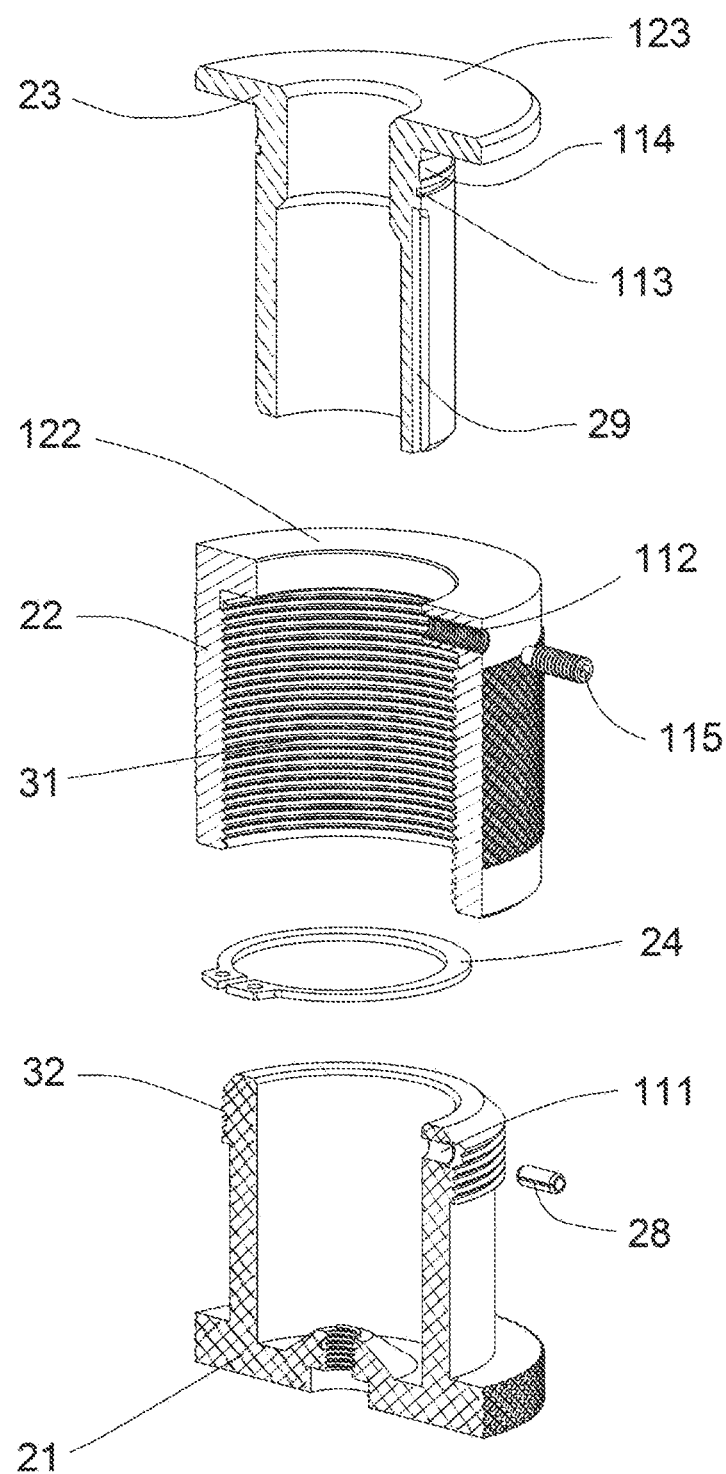
FIG. 2 shows the exploded view of the various components.
Figure 3:
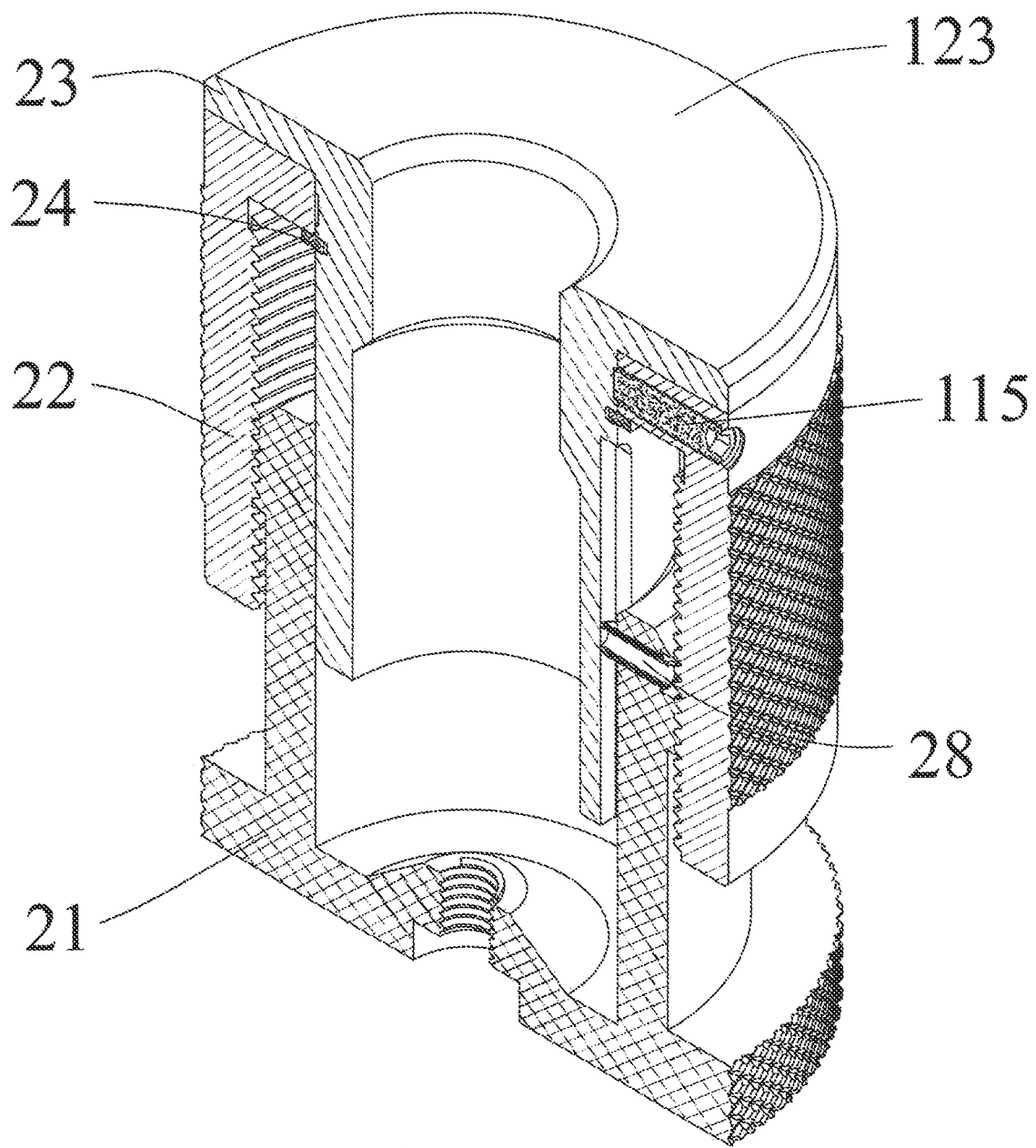
FIG. 3 represents the profile (cutout) view of an assembled product, with the matching screw threads clearly shown.

The base 21 is substantially in a tubular or cylindrical shape, with an outer screw thread portion 32 on upper part of the base 21. The base 21 has a key hole 111 where a key 28 can be inserted through, to reach the vertical straight groove 29 on the cylindrical post 23, as shown in FIGS. 2 and 3.

The key 28, inserting through key hole 111 and reaching the vertical straight groove 29, prevents the cylindrical post 23 from being turned relative to the base 21 while the up-and-down height adjustment is being done by an operator/worker by rotating the cylindrical knob 22.

The cylindrical knob 22 is also substantially in a tubular or cylindrical shape and is rotatably fitted to the outside of the base 21. The cylindrical knob 22 has an inner screw thread portion 31 matching the outer screw thread portion 32 of the base 21. FIG. 1 shows the cylindrical knob 22 fitted to the outside of base 21, with the cylindrical post 23 fitted on top, having the tube body inserted vertically inside the tube body of the cylindrical knob 22.

The cylindrical knob 22 further has a top surface 122. The inner screw thread portion 31 matching the outer screw thread portion 32 can be seen in FIG. 3 where the profile view shows the cylindrical post 22 is engaged onto the base 21 via the two thread portions 31 and 32.

The cylindrical post 23 is also substantially in a tubular or cylindrical shape and further has an outside vertical straight groove 29 and a flange 123 on top end of the cylindrical post 23. A snap groove 113 is formed around the outside tube body of the post 23 and under the flange 123. The snap groove 113 receives the snap ring 24.

The cylindrical knob 22 further has a threaded hole 112 with matching locking screw 115; the cylindrical post 23 further has a landing groove 114 for receiving the locking screw 115. The locking screw 115 can be inserted through the threaded hole 112 and onto the landing groove 114 to lock the height adjustable rest 11 in place when a desired height is reached.

As clearly shown in the drawings (particularly FIG. 3), the cylindrical post 23, the cylindrical knob 22 and the base 21 are arranged in the same axial orientation where the cylindrical knob 22 is fitted over the outside of the base 21 and the cylindrical post 23 is placed vertically into the center area of the knob 22 and the base 21, with the snap ring 24 clipped into the snap groove 113 under the flange 123 of the cylindrical post 23.

Figure 4:
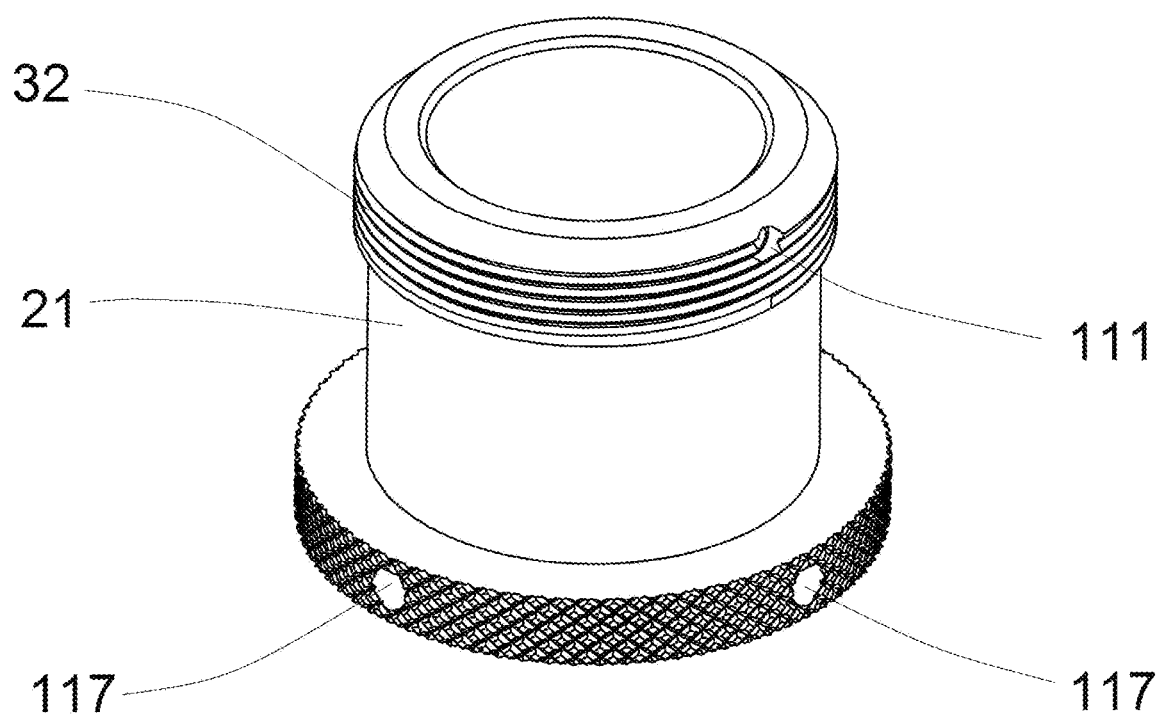
FIG. 4 shows the base with base holes evenly spaced around the circumference.

The base 21 further has a plurality of base holes 117, and a plurality of rods 128 that can be inserted into the base holes 117 to provide better torque when holding or turning the base 21. Preferably, the base holes 117 will be spaced out evenly around the circumference of the base 21 as shown in FIG. 4 that best provides torqueing application when the rods 128 are inserted.

The cylindrical knob 22 further has a plurality of knob holes 116, and a plurality of rods 128 that can be inserted into the knob holes 116 to provide better torque when holding or turning the cylindrical knob 22. Preferably, the knob holes 116 will be spaced out evenly around the circumference of the knob 22 as shown in FIG. 1 that best provides torqueing application when the rods 128 are inserted.

With the structure disclosed above, the height adjustable rest 11 of present application provides for a convenient work took to support a workpiece for various purpose, such as on a welding table or any other work surfaces.

The flange 123 provides a strong and stable surface to prop up heavy objects, with the snap ring 24 snugly fitted to the snap groove 31 to prevent the cylindrical post 23 from dropping off.

If the workpiece is large or heavy, it may be hard (hard to reach and/or tight due to weight received from the flange 123) to turn the base 21 or the cylindrical knob 22 by human fingers. The base holes 117 and the knob holes 116, along with the rods 128, will come in handy to increase the turning torque and make it easier to fine-tune the base 21 and knob 22, in order to reach a desired height.

The matching screw thread portions 31 and 32 feature protects the threads from damage by the debris generated by welding or any work process, as compared to other comparable designs that exposed screw threads.

It should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A height adjustable rest, comprising:
   a base further having an outer screw thread portion on an upper part of the base, a key and a key hole for receiving the key;
   a cylindrical knob rotatably fitted to an outside of the base, said cylindrical knob further having a top surface and an inner screw thread portion matching the outer screw thread portion of the base;
   a cylindrical post further having an outside vertical straight groove, a flange on top end of the cylindrical post and a snap groove; and
   a snap ring, wherein the snap ring is placed under the flange of the cylindrical post and inside the cylindrical knob and fitted to the snap groove of the cylindrical post.

2. The height adjustable rest of claim 1, wherein the cylindrical knob further having a threaded hole with matching locking screw and the cylindrical post further having a landing groove for receiving the locking screw.

3. The height adjustable rest of claim 2, wherein the base further having a plurality of base holes and a plurality of rods that can be inserted into the base holes to provide better torque when holding or turning the base.

4. The height adjustable rest of claim 2, wherein the cylindrical knob further having a plurality of knob holes and a plurality of rods that can be inserted into the knob holes to provide better torque when holding or turning the cylindrical knob.

* * * * *